(12) United States Patent
Ishida

(10) Patent No.: US 11,843,659 B2
(45) Date of Patent: Dec. 12, 2023

(54) SERVER SYSTEM, INFORMATION PROCESSING METHOD, AND STORAGE MEDIUM

(71) Applicant: CANON KABUSHIKI KAISHA, Tokyo (JP)

(72) Inventor: Tomoya Ishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/935,498

(22) Filed: Sep. 26, 2022

(65) Prior Publication Data

US 2023/0102025 A1 Mar. 30, 2023

(30) Foreign Application Priority Data

Sep. 27, 2021 (JP) .................................. 2021-156654

(51) Int. Cl.
*H04L 67/1001* (2022.01)
*H04L 67/00* (2022.01)

(52) U.S. Cl.
CPC .......... *H04L 67/1001* (2022.05); *H04L 67/34* (2013.01)

(58) Field of Classification Search
CPC ........................... H04L 67/1001; H04L 67/37
See application file for complete search history.

(56) References Cited

U.S. PATENT DOCUMENTS

| 10,599,740 B1 * | 3/2020 | McCabe | H04L 67/01 |
| 11,080,065 B1 * | 8/2021 | Reshadi | H04L 67/564 |
| 2017/0277909 A1 * | 9/2017 | Kraemer | G06F 21/10 |
| 2021/0075881 A1 * | 3/2021 | Radhakrishnan | H04L 67/63 |

FOREIGN PATENT DOCUMENTS

JP 2009042944 A 2/2009

* cited by examiner

*Primary Examiner* — Kostas J Katsikis
(74) *Attorney, Agent, or Firm* — Canon U.S.A., Inc. IP Division

(57) ABSTRACT

Provided is a server system including: a reception unit configured to receive a download request from second software executed by a client; an identification unit configured to identify a download method based on the download request; and a processing unit configured to perform a process of switching to causing the client to download the first software from the edge server or causing the client to download the first software from the origin server, according to the identified download method.

15 Claims, 10 Drawing Sheets

SERVER SYSTEM, INFORMATION PROCESSING METHOD, AND STORAGE MEDIUM

BACKGROUND

Field of the Disclosure

The present disclosure relates to a technique for controlling downloading of software.

Description of the Related Art

A content delivery network (hereinafter referred to as "CDN") is one way to efficiently distribute software. A CDN is a technique that enables high-speed distribution of contents. In a CDN, a server in which original contents are placed is called an origin server. Also, servers installed at various bases in the world are called edge servers. The edge servers cache the contents placed in the origin server. By accessing an edge server that is physically closer in distance than to the origin server, a user can quickly obtain a content with a shortened read delay.

Here, a vendor who wishes to use a CDN service to distribute software often has to pay a usage fee to a public cloud vendor that provides the CDN service or the like.

Japanese Patent Laid-Open No. 2009-42944 (Document 1) discloses a technique in which an external storage is disposed for a supernode disposed for an edge server and software is downloaded by a P2P technique without using a CDN in a case where the target file is present in the external storage.

Document 1 is a distribution technique combining a CDN technique and a P2P technique, and the configuration is complicated. There is a demand to use the mechanism of a CDN and also to reduce downloads from edge servers, thereby curving costs, without impairing usability.

SUMMARY

A server system according to one aspect of the present disclosure is a server system which includes at least an edge server capable of caching first software to be downloaded and an origin server having an original of the first software placed therein, and communicates with a client, the server system including: a reception unit configured to receive a download request from second software executed by the client; an identification unit configured to identify a download method based on the download request; and a processing unit configured to perform a process of switching to causing the client to download the first software from the edge server or causing the client to download the first software from the origin server, according to the download method identified by the identification unit.

Further features of the present disclosure will become apparent from the following description of exemplary embodiments with reference to the attached drawings.

DESCRIPTION OF THE EMBODIMENTS

Figure 1:
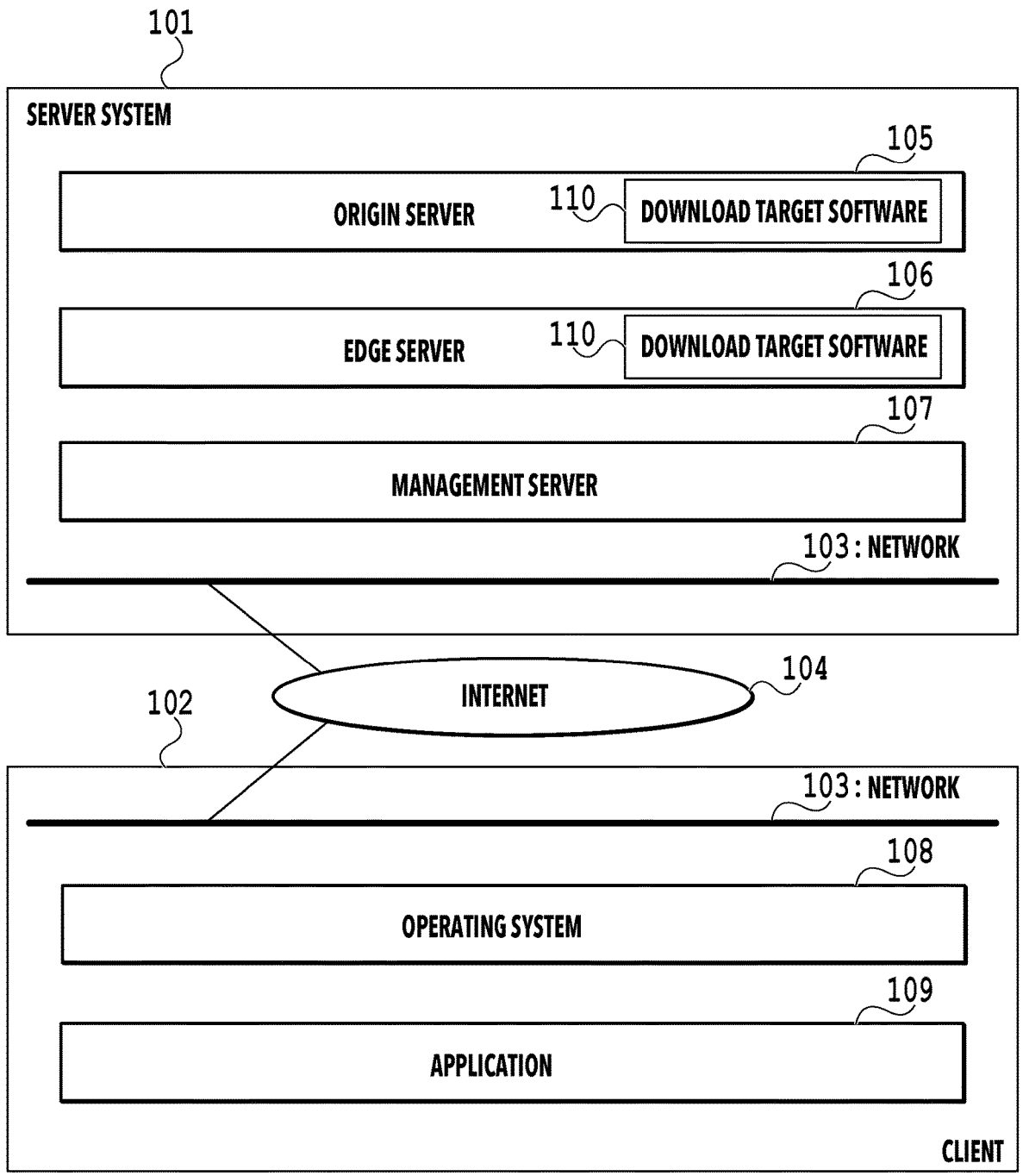
FIG. 1 is a diagram illustrating an example of an information processing system.

Preferred embodiments of the present disclosure will be specifically described with reference to the accompanying drawings. Note that the following embodiments do not limit the contents of the present disclosure, and not all of the combinations of the features described in these embodiments are necessarily essential for the solving means of the present disclosure. Note that identical constituent components are denoted by the same reference numeral and description thereof is omitted.

First Embodiment

In the present embodiment, a configuration employed in an information processing system using a CDN will be described. Prior to the description of the embodiment, a supplementary description of a CDN will be given. As mentioned above, in a CDN, contents are distributed to users from edge servers that are physically closer in distance than to an origin server. This brings about an advantage that contents can be distributed to users quickly. However, a CDN needs edge servers to be installed at various bases in the world, and providers of CDN services have to pay high costs. A vendor who wishes to use a CDN service to distribute software often has to pay a usage fee to a public cloud vendor that provides the CDN service or the like. This usage fee is often paid by volume based on the size of the software to be downloaded. Thus, for example, in a case where a large number of users download large-volume software via a CDN, the vendor that provides and distributes the software will have to pay a high CDN usage fee.

To address this, the present embodiment involves identifying a download request from an application on a client side and switching to downloading the target software from an origin server or downloading the target software from an edge server according to the result of the identification. In the case of downloading the software from the origin server, the download often takes a longer time than from an edge server. This leads to a possibility that usability may deteriorate due to the wait for the completion of the download. In the present embodiment, in a case where this usability deterioration is acceptable, the software is downloaded from the origin server. In this way, it is possible to reduce the volume of downloads from edge servers, thereby curbing costs, without impairing usability. A specific configuration will be described below.

<System Configuration>

FIG. 1 is a diagram illustrating an example of an information processing system in the present embodiment. The information processing system has a server system 101 and a client 102. The server system 101 and the client 102 are configured to be capable of communicating with each other from respective networks 103 via an Internet 104.

The server system 101 has an origin server 105, an edge server 106, and a management server 107. The origin server 105, the edge server 106, and the management server 107 are each a type of information processing apparatus. In the illustration of FIG. 1, the servers are separated in terms of functionality. Note, however, that some servers may be configured as a single server apparatus. For example, the management server 107 and the origin server 105 or the edge server 106 may be configured as a single server apparatus. The origin server 105 and the edge server 106 are provided at locations physically distant from each other. Also, the origin server 105 is not limited to a configuration where it is formed of a single server, and may be formed of a plurality of servers that operate in conjunction with each other (i.e., a server system). This also applies to the edge server 106 and the management server 107.

The client 102 is an information processing apparatus, such as a computer, a smartphone, or a tablet. The client 102 has an operating system 108 and an application program (hereinafter "application") 109. The application 109 operates on the client 102. The application 109 can be an application on a smartphone with iOS, Android, or the like. Also, the application 109 can be any of various software programs such as desktop applications of Windows (registered trademark), macOS (registered trademark), and the like. Also, the application 109 can be any of various software programs such as drivers and browsers. The application 109 may be a setting application that configures various settings of a smartphone. Note that this setting application may be included in the operating system 108 or be an application separate from the operating system 108. Also, the application 109 may be a communication device setting application that configures various settings of a communication device of a printer or the like from the client 102, or configures various settings of the client 102 for using the communication device from the client 102. Also, the application 109 may be an album application that, for example, generates album data from images selected and input by a user and places an order for an album based on the album data. Examples of the operating system 108 include various software programs as listed above, such as iOS, Android, Windows (registered trademark), and macOS (registered trademark).

The management server 107 is a server that operates on the backend of the application 109 executed by the client 102. Download target software 110 is placed in the origin server 105. The download target software 110 is cached and placed in the edge server 106 as well.

Examples of the download target software 110 include software programs such as an application, a driver, firmware, and an operating system. In the present embodiment, a software program to be downloaded will be referred to as "download target software 110" for convenience of description. As mentioned above, the "download target software 110" may be the operating system 108 or the application 109. Specifically, an updated version of the operating system 108 or the application 109 may be the "download target software 110". That is, the "download target software 110" may be the same type of software as the operating system 108 or the application 109. Alternatively, the "download target software 110" may be a different type of software from the operating system 108 or the application 109. In the present embodiment, the "download target software 110" placed on the server system 101 side will be regarded as first software to be downloaded. The "operating system 108" or the "application 109" placed on the client 102 side will be regarded as second software that makes a download request. The first software and the second software may be the same type of software or different types of software.

<Hardware Configuration>

Figure 2:
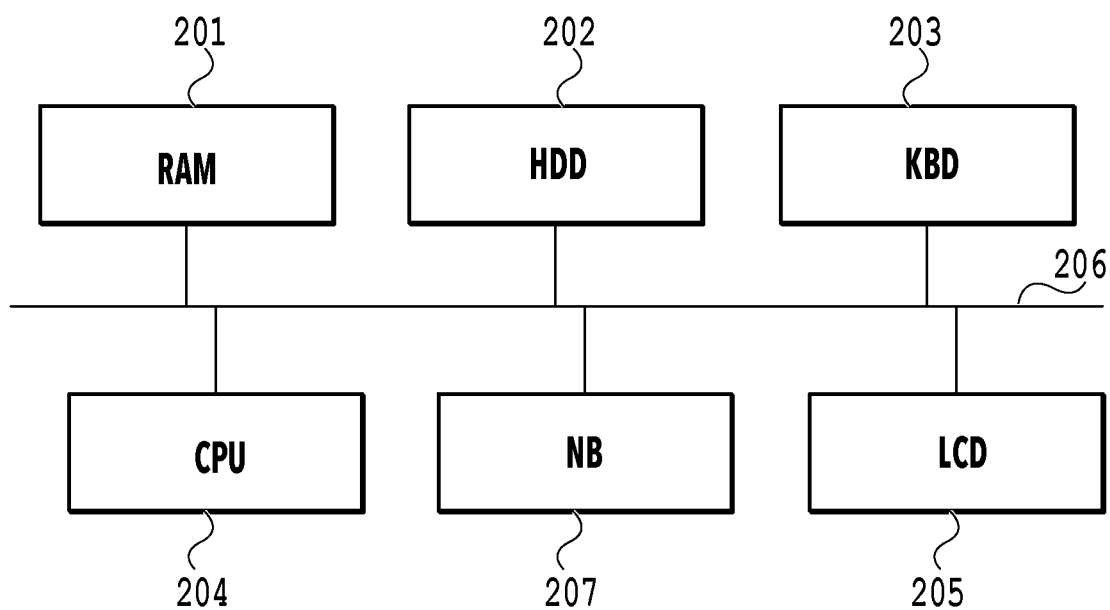
FIG. 2 is a diagram illustrating an example of the hardware configuration of an information processing apparatus.

FIG. 2 is a diagram illustrating an example of the hardware configuration of an information processing apparatus in the present embodiment. Specifically, FIG. 2 is a diagram illustrating an example of the hardware configuration of each server in the server system 101 in FIG. 1 and the hardware configuration of the client 102. The information processing apparatus includes a RAM 201, an HDD 202, a KBD 203, a CPU 204, an LCD 205, a bus 206, and an NB 207.

The RAM 201 is a temporary storage unit such as a random access memory unit. The HDD 202 is a storage unit such as a hard disk drive unit. The KBD 203 is an input unit such as a keyboard unit. The CPU 204 is a processing unit. The LCD 205 is a display unit such as a display monitor. The bus 206 is a bus communicatively connecting each block. An NB 207 is a communication unit such as a network board.

While the HDD 202 is illustrated as an example of the storage unit, a portable CD-ROM, a built-in ROM, or the like may be employed as the storage unit. A touch panel display combining an input unit and a display unit may be included. The information processing apparatus does not have to include a display unit. Thus, the example illustrated in FIG. 2 is merely one example. Other components may be included. Not all of the components illustrated in FIG. 2 may be included.

Sequence in Comparative Example

First, a processing sequence typically performed in an information processing system as illustrated in FIG. 1 will be described as a comparative example before describing a processing sequence in the present embodiment, in order to facilitate understanding.

Figure 3:
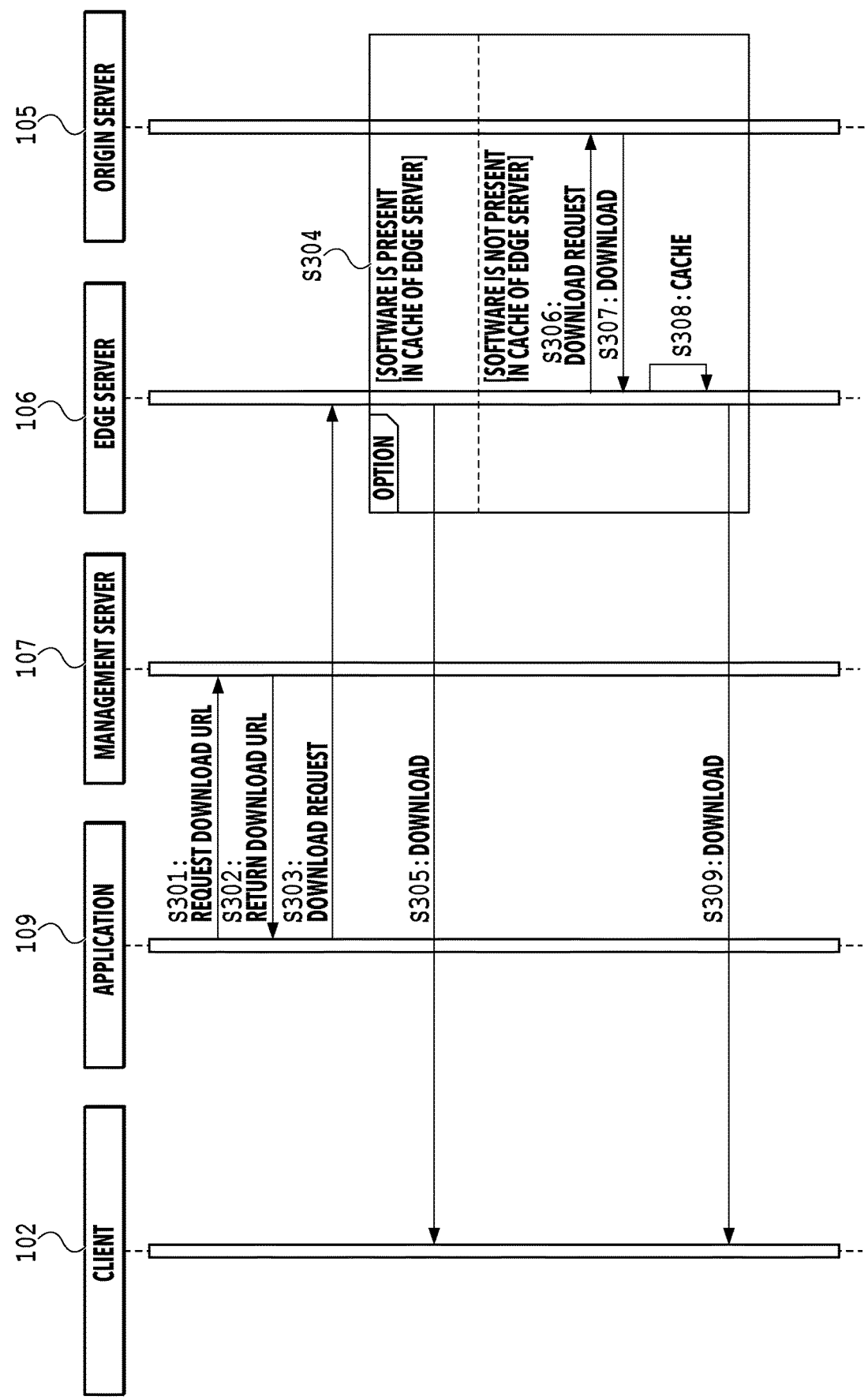
FIG. 3 is a diagram illustrating a typical sequence as a comparative example.

FIG. 3 is a diagram illustrating a typical sequence, as a comparative example, performed in case where the application 109 on the client 102 downloads software by using a CDN. The series of processes illustrated in the sequence in FIG. 3 are executed by the CPUs 204 of the client 102, the management server 107, the edge server 106, and the origin server 105. That is, the CPUs 204 of these information processing apparatuses perform the series of processes illustrated in the sequence in FIG. 3 by loading pieces of program code stored in the HDDs 202 or the like to the RAMs 201 and executing them. Alternatively, the functions of some or all of the steps in FIG. 3 may be implemented with hardware such as ASICs or electronic circuits. Meanwhile, the symbol "S" in the description of each process means a step in the sequence chart (the same applies herein). In the following, the actors of the processes are the CPUs 204 included in the client 102, the management server 107, the edge server 106, and the origin server 105. Note that, in FIG. 3, the application 109 on the client side is also illustrated as the actor of some processes to facilitate understanding. The actor of the processes of the application 109 is also the CPU 204 of the client 102.

In S301, the application 109 requests a uniform resource locator (URL) where the download target software 110 is placed from the management server 107. Hereinafter, this URL indicating the download source will be referred to as "download URL". Incidentally, in this requesting process, information on the location of the application 109 (client 102), for example, may be sent to the management server

107. In S302, in response to receiving this request, the management server 107 returns the download URL to the application 109. Here, the returned download URL is the URL of the edge server 106. For example, the management server 107 returns the URL of the edge server 106 installed at a location near the application 109 (client 102) among the plurality of edge servers 106 installed in the world.

In S303, the application 109 makes a download request to the download URL returned in S302. Then, in S304, the edge server 106 switches the processing based on whether the download target software 110 is presented in a cache of the edge server 106. The cache refers to a temporary data storage region and is a region in the edge server 106 which can be accessed at a high speed. In the following, temporarily storing data in this region will also be expressed as "caching" data. Moreover, in the following, a state where target data is stored in this region will also be expressed as "data is present in a cache".

The edge server 106 firstly determines whether the download target software 110 is present in a cache of the edge server 106. If the download target software 110 is present in the cache of the edge server 106, the edge server 106 proceeds to S305 and sends the download target software 110 to the client 102. In other words, the edge server 106 causes the client 102 to download the download target software 110.

On the other hand, if the download target software 110 is not present in the cache of the edge server 106, the edge server 106 proceeds to S306 and makes a request to download the download target software 110 to the origin server 105. In response to receiving the request from the edge server 106, the origin server 105 sends the download target software 110 to the edge server 106 in S307. In other words, the origin server 105 causes the edge server 106 to download the download target software 110. In response to downloading the download target software 110, the edge server 106 caches the download target software 110 in S308. Then, in S309, the edge server 106 sends the cached download target software 110 to the client 102. In other words, the edge server 106 causes the client 102 to download the download target software 110.

As described above, with a typically used CDN mechanism, in a case where the download target software 110 is present in the edge server 106, its content (download target software 110) is distributed (downloaded) from the edge server 106. In a case where the download target software 110 is not present in the edge server 106, the edge server 106 downloads this software 110 from the origin server 105 and caches the software 110. Then, the edge server 106 causes the client 102 to download the cached download target software 110. FIG. 3 illustrates a processing example in which the application 109 requests the download URL. Note, however, that the operating system 108 may perform the process of requesting the download URL. That is, the application 109 in FIG. 3 may be replaced with and read as the operating system 108. This applies also to the sequence charts to be described later herein.

Sequence in Present Embodiment

Figure 4:
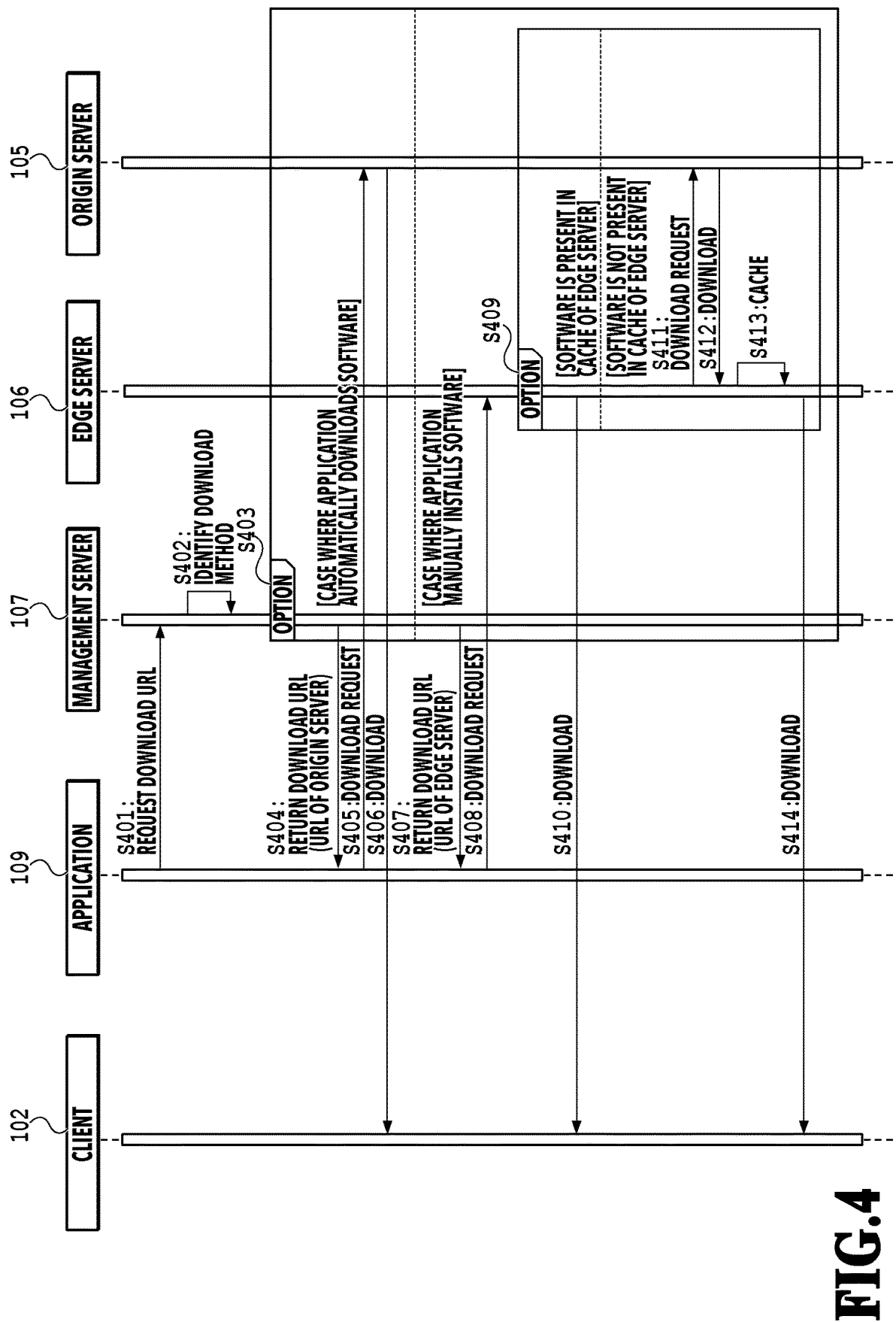
FIG. 4 is a diagram illustrating an example of a processing sequence.

FIG. 4 is a diagram illustrating an example of a processing sequence in the present embodiment. Processing in the present embodiment will be described using FIG. 4. In S401, the application 109 requests the download URL of the download target software 110 from the management server 107. Note that, in this requesting process, information on the download method (hereinafter "download method information") for the request in S401, for example, is sent to the management server 107. Moreover, in this requesting process, information on the location of the application 109 (client 102), for example, may be sent to the management server 107. In S402, the management server 107 identifies (determines) the download method for the request in S401 based on the download method information. To identify the download method is, for example, to identify the type of the application 109 attempting to perform a download with the request in S401 (in other words, the application 109 used for the request in S401). Thus, the download method information is, for example, information indicating the type of the application 109. The information indicating the type of the application 109 may be, for example, the name or the like of the application 109 used for the request in S401. In the present embodiment, there are a first application (hereinafter referred to as "application 109-*a*") and a second application (hereinafter referred to as "application 109-*b*") as types of the application 109. Details of each application will be described later. Moreover, in the present embodiment, there are automatic downloading and manual downloading as methods of downloading the software 110. The automatic downloading will be described first. The automatic downloading will be described by taking "entrusted installation" and "automatic updating" as examples.

First, "entrusted installation" will be described. Assume, for example, that there are a plurality of pieces of download target software 110, for example. A case where the application 109 is a setup application that collectively downloads and installs these pieces of software 110 corresponds to an example of performing "entrusted installation". Such a setup application is typically equipped with a mode which enables the pieces of download target software 110 to be collectively downloaded and installed without the user having to perform an explicit clicking operation or the like for each single piece of software 110 to download it. Installation using such a mode will be referred to as "entrusted installation". In "entrusted installation", recommended pieces of software are automatically and collectively downloaded. For this reason, the user is rarely aware of which piece of software is being downloaded. That is, for the user, usability is unlikely to deteriorate even if a situation where it takes time to complete the downloads occurs.

Figure 9A:
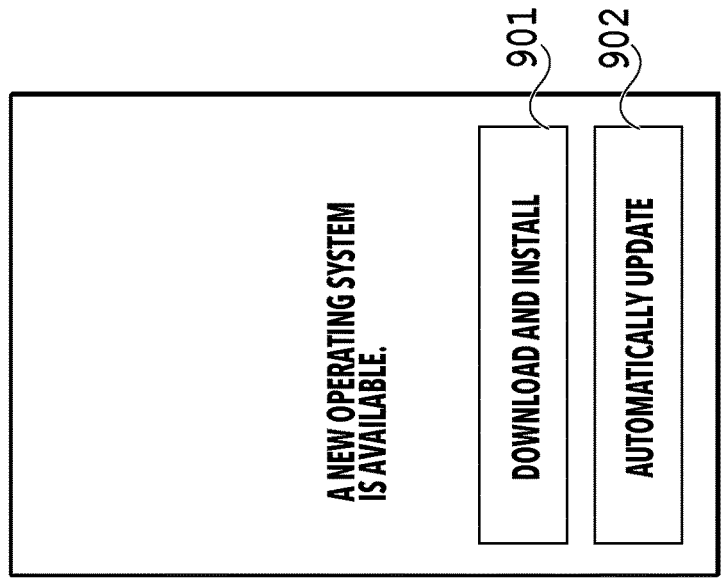
FIGS. 9A to 9C are diagrams for describing examples of automatic downloading and manual downloading.
Figure 9B:
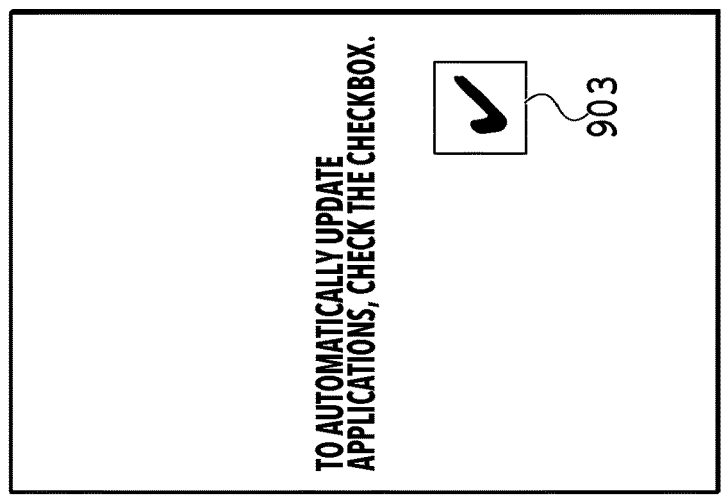

Next, "automatic updating" will be described. Smartphones and the like are equipped with a mode in which the operating system 108 or the application 109 is downloaded and updated while no user operation is performed, such as at night. Updating (installation) using such a mode will be referred to as "automatic updating". FIG. 9A illustrates an example of "automatic updating" of the operating system 108. Requesting of a download URL by the application 109 performed in response to the user's input instruction on "Automatically update" 902 in FIG. 9A represents automatic updating. An example of "automatic updating" of the application 109 is illustrated in FIG. 9B. Requesting of a download URL by the application 109 performed in response to the user checking a checkbox 903 in FIG. 9B represents automatic updating. Details of FIGS. 9A and 9B will be described later. Also, as mentioned above, a setting application that sets automatic updating may be included in the operating system 108 or prepared as the application 109 separate from the operating system 108. The present embodiment will be described on the assumption that the setting application is prepared as the application 109 separate from the operating system 108. The automatic updating is a mode in which downloads and updates are performed while no user operation is performed, such as at night. Thus, usability is unlikely to deteriorate even if a situation where it takes time to complete the downloads occurs.

In "entrusted installation" and "automatic updating" as described above, the user does not perform clicking operations or the like to intentionally issue instructions to download the individual pieces of download target software 110. That is, in a state where "entrusted installation" or "automatic updating" is executed, the user is rarely aware that the pieces of software are being downloaded, and therefore does not wait for the completion of the downloads. Hence, even if it takes time to complete the downloads, the user is presumably unlikely to feel frustrated. Download methods like "entrusted installation" and "automatic updating" in which software is downloaded without the user's intension will be referred to as "automatic downloading" herein.

In the present embodiment, the application 109-*a* is a communication device setting application capable of executing "entrusted installation". Software 110 to be installed in "entrusted installation" is an album application. That is, the software 110 to be downloaded in response to a download request from the application 109-*a* is a program different from the application 109-*a* and is also a program different from a program for updating the application 109-*a*. In other words, the application 109-*a* is a program that is not a program to be updated by the software 110 to be downloaded in response to a request from the application 109-*a*. Note that the application 109-*a* may be an installation application to be installed in the client 102 along with a communication device setting application. Specifically, the application 109-*a* may be an installation application that operates to execute "entrusted installation" in response to an instruction from a communication device setting application. Note that settings of a communication device to be configured by the communication device setting application are, for example, wireless connection settings for wirelessly connecting the communication device to an access point. In the present embodiment, after completing configuring the wireless connection settings, the communication device setting application receives an instruction for "entrusted installation" from the user and installs various applications related to the communication device by "entrusted installation". The software 110 is included in the applications installed at this time. That is, for example, in response to execution of an operation for "entrusted installation" on the communication device setting application, which is the application 109-*a*, the communication device setting application executes the process of S401. Note that the application 109-*a* may be an installation application. Then, in S402, the type of application 109 used for the request in S401 is identified to be the application 109-*a*. That is, the download method for the request in S401 is identified to be the download method for a request from the application 109-*a*.

If the download method for the request in S401 is the download method for a request from the application 109-*a*, a process of S404 is performed. Note that the download method for a request from the application 109-*a* is, for example, a download method to be executed by "entrusted installation", as mentioned above. Thus, the download method for a request from the application 109-*a* is, in other words, a download method to be executed based on an operation for collectively installing a plurality of applications. In S404, the management server 107 returns the URL of the origin server 105, which requires a longer download time than the edge server 106, to the application 109 as the download URL. In response to receiving this download URL, the application 109 makes a download request to the URL of the origin server 105 in S405. In response to receiving this download request, the target software is downloaded from the origin server 105 into the client 102 in S406. In other words, the origin server 105 causes the client 102 to download the target software. It takes a longer time to download the target software from the origin server 105 in S405 than from the edge server 106. Nonetheless, since the edge server 106, which is provided by a CDN or the like, is not used for the download in S405, the costs required for the download can be curbed as compared to the case of using the edge server 106. The above is a description of the processing for "automatic downloading".

Next, processing for "manual downloading" will be described. Manual downloading of software refers to a case where the user, for example, presses a download button on the client 102 with a clicking operation to intentionally download target software 110. In this case, since the user intentionally downloads the software, it is assumed that the user waits for the completion of the download. Thus, in the present embodiment, in the case of manual downloading, the system is controlled to download the software from the edge server 106, with which downloading is faster.

Figure 9C:
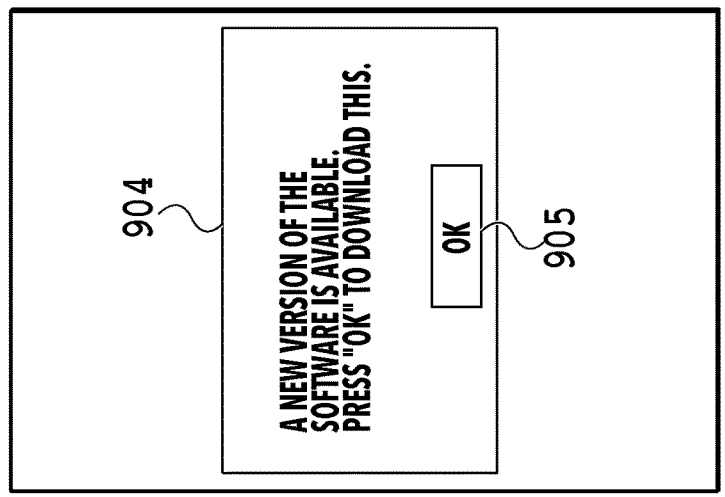

Three examples of manual downloading are given below. A first example is a case where the user has started the application 109, which happens to be an old version, and is therefore prompted to download a new version of software. That is, the manual downloading in this example is downloading of software 110 for updating the application 109. Thus, the software 110 in this example may be the latest version of the application 109 itself or software for updating the old version of the application 109 to the latest version. FIG. 9C illustrates an example where the user is prompted to download a new version of software. This case is considered manual downloading since the user intentionally presses a download button, for example, to download the new version. Note that FIG. 9C is an example where the application 109 downloads an updated version of "download target software 110" being the same type of software as the application 109.

A second example is a case where the user searches for a new version of software with a browser or the like and downloads it. This case is also considered manual downloading since the user intentionally performs the download. In this case, the application 109 is the browser, which is used to download "download target software 110" being a different type of software from the application 109.

A third example is a case where, with a smartphone or the like, the user manually realizes that there is a new version of the application 109 or the operating system 108 via notification or the like, and instantly downloads the new version and updates the application 109 or the operating system 108 to it. This example corresponds to a case where "Download and install" 901 in FIG. 9A is selected. This case is considered manual downloading since the user instantly downloads and installs a new version.

In the present embodiment, the application 109-*b* is an album application which is capable of executing "manual downloading" for updating the application 109-*b*. That is, the application 109-*b* is a program to be updated by software 110 which is downloaded in response to a request from the application 109-*b*. For example, in a case where the user executes an updating operation on the application 109-*b*, the process of S401 is executed, and the type of the application 109 used for the request in S401 is identified to be the application 109-*b* in S402. That is, the download method for the request in S401 is identified to be the download method for a request for the application 109-*b*.

If the download method for the request in S401 is the download method for a request from the application 109-b, the processes of S404 to S406 are not performed, and processes of S407 and subsequent steps are performed instead. Note that the download method for a request from the application 109-b is, for example, a download method to be executed to update the application 109, as described above, and is a download method for installing only software 110. Thus, the download method for a request from the application 109-b is, in other words, a download method to be executed based on an operation for installing only a single piece of software 110.

In S407, the management server 107 returns the download URL of the edge server 106 to the application 109. In response to receiving this download URL, the application 109 makes a request to download the download target software 110 to the edge server 106 in S408.

In response to receiving this download request, a process of S409 is performed. In S409, the processing branches based on whether the download target software 110 is present in the edge server 106. If the download target software 110 is present in the edge server 106, the processing proceeds to S410. In S410, the download target software 110 is sent from the edge server 106 to the client 102. In other words, the edge server 106 causes the client 102 to download the download target software 110.

On the other hand, if the download target software is not present in the edge server 106, a process of S411 is performed. In S411, the edge server 106 makes a download request to the origin server 105. In response to receiving this download request, the origin server 105 sends the download target software 110 to the edge server 106 in S412. In other words, the origin server 105 causes the edge server 106 to download the download target software 110. In response to downloading the download target software 110 from the origin server 105, the edge server 106 caches the downloaded software in S413. Subsequently, in S414, the edge server 106 sends the cached download target software 110 to the client 102 as a response to the download request in S408. In other words, the edge server 106 causes the client 102 to download the download target software 110.

As described above, in the present embodiment, the management server 107 having received a download URL request performs a process of identifying the download method. Then, the subsequent processing is switched according to the download method.

In the present embodiment, based on the download URL request from the application 109, the management server 107 performs a process of identifying whether the download target software 110 is to be automatically downloaded or manually downloaded (S402). The method of this identification may be, for example, a method in which the management server 107 identifies the download method based on information obtained from the download URL sent from the application 109. Specifically, for example, there is a method in which, in a case where the download request is made in Hypertext Transfer Protocol (HTTP), the identification is made based on a parameter appended to the URL which identifies whether the download is automatic or manual. The following are examples of the parameter.
<Examples of Parameter>
http://xxx.com/?download=auto, http://xxx.com/?download=manual
Also, there is a method in which whether the download is automatic or manual is identified by referring to a parameter appended to the header or body of an HTTP request. The following are an example with the header and an example with the body.
<Example with Header>
GET/xxx.html HTTP/1.1
Host: xxxxxxxxxxxxxx
User-Agent: xxxxxxxxxxxxxxxxx
Download-Method: Auto
<Example with Body (Described after Header)>
Download-Method=Auto
Alternatively, the URL itself may be different for automatic downloading and for manual downloading, and the application 109 may switch the URL to be called according to the download method.

The above-described information to be used to identify whether automatic downloading or manual downloading is to be performed may be send by the application 109 based on information conventionally used as a download URL request. In a case where this kind of information is not sent from the application 109 to the management server 107, the application 109 or the like may be corrected so as to send this kind of information in a noticeable manner. Note that the above examples are merely some examples, and any method may be employed as long as the management server 107 can identify whether automatic downloading or manual downloading is to be performed based on a download request from the application 109.

Note that the identification of the download method in S402 is not limited to any of the above methods. The identification of the download method in S402 may be, for example, identification of whether the type of the downloading to be performed in response to the request in S401 is automatic downloading or manual downloading. Also, the download method information may be, for example, information indicating whether this type is automatic downloading or manual downloading. In this case, if the type of the application 109 used for the request in S401 is the application 109-a, the download method is identified to be automatic downloading. On the other hand, if the type of the application 109 used for the request in S401 is the application 109-b, the download method is identified to be manual downloading.

Also, the identification of the download method in S402 may be the following identification. Specifically, the identification of the download method in S402 may be identification of whether the download method to be performed in response to the request in S401 is the download method which is executed based on an operation for collectively installing a plurality of applications. Moreover, the download method information may be, for example, information indicating the type of operation based on which the downloading is to be performed.

Also, in the present embodiment, each application 109 supports only automatic downloading or only manual downloading, but is not limited to this configuration. A single application 109 may be configured to support both automatic downloading and manual downloading (a single application 109 can execute both automatic downloading and manual downloading). In that case, the identification of the download method in S402 is preferably identification of whether the type of the downloading to be performed in response to the request in S401 is automatic downloading or manual downloading.
<Flowcharts>
Flowcharts involving the application and the servers corresponding to the sequence in FIG. 4 will be described below using FIGS. 5 to 8. In the following description of the flowcharts of FIGS. 5 to 8, the steps described in the sequence in FIG. 4 will be denoted in parentheses. Also, as with the above description, the series of processes illustrated in the following flowcharts are executed by the CPUs 204 of the client 102 (FIG. 5), the management server 107 (FIG. 6), the edge server 106 (FIG. 7), and the origin server 105 (FIG. 8). That is, the CPU 204 of each information processing apparatus performs a corresponding one of the series of processes illustrated in the flowcharts of FIGS. 5 to 8 by loading program code stored in the HDD 202 or the like to the RAM 201 and executing it.

Figure 5:
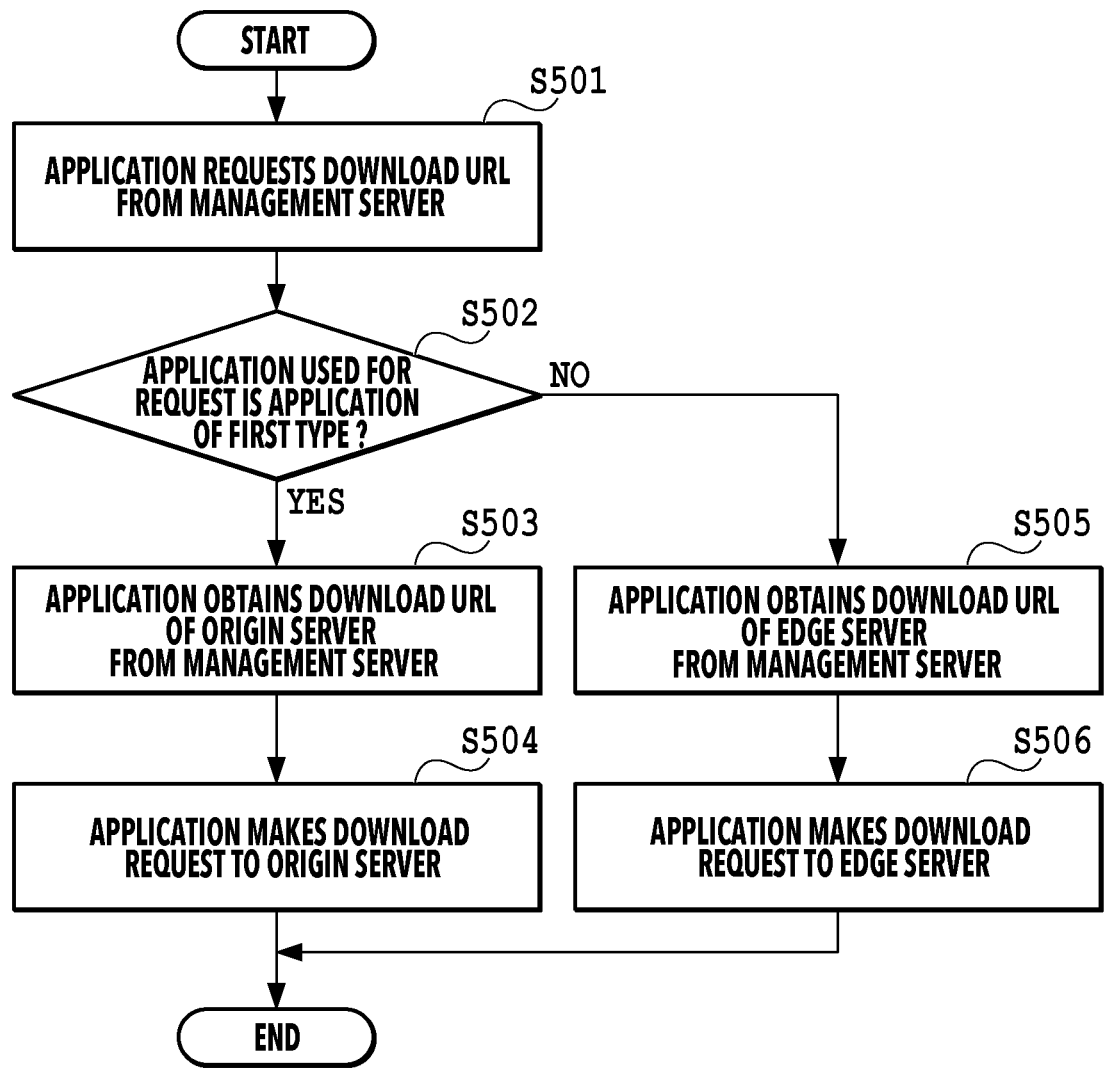
FIG. 5 is a flowchart illustrating an example of processing by an application.

FIG. 5 is a flowchart illustrating an example of processing by the application 109 in the present embodiment. In S501, the application 109 requests a download URL from the management server 107 (S401). In the present embodiment, the processing is switched based on whether the application 109 used for the request in S501 is an application 109 of a first type supporting automatic downloading or an application 109 of a second type supporting manual downloading. Thus, in S502, it is determined whether the application 109 used for the request in S501 is the application 109 of the first type supporting automatic downloading. Note that this determination corresponds to the identification in S402. If the result of the determination is YES, the processing proceeds to S503. If the result of the determination is NO, the processing proceeds to S505. Note that, as mentioned earlier, download method information is sent at the time of making the request to the management server 107 in S501. Thus, S502 represents that the subsequent processing is switched based on the result of the process by the management server 107.

If the application 109 is the application 109 of the first type supporting automatic downloading, the application 109 obtains the download URL of the origin server 105 from the management server 107 in S503 (S404). Then, in S504, the application 109 makes a download request to the origin server 105 by using the obtained download URL (S405).

On the other hand, if the application 109 is not the application 109 of the first type supporting automatic downloading, the application 109 obtains the download URL of the edge server 106 from the management server 107 in S505 (S407). Then, in S506, the application 109 makes a download request to the edge server 106 by using the obtained download URL (S408).

After S504 and S506, a download process is performed by the client 102. Then, the download target software 110 is, for example, installed into the client 102 and thus becomes ready to be used on the client 102. Note that the download target software 110 does not necessarily have to be in an installed form.

Figure 6:
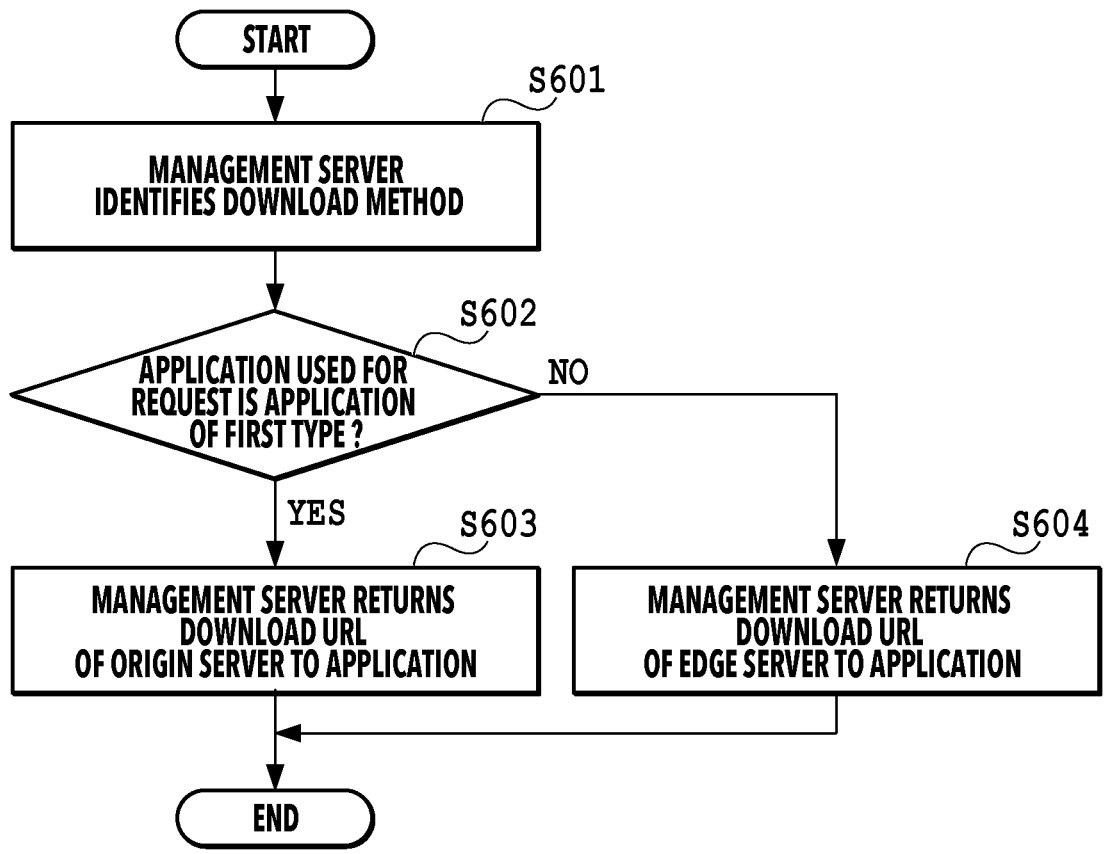
FIG. 6 is a flowchart illustrating an example of processing by a management server.

FIG. 6 is a flowchart illustrating an example of processing by the management server 107 in the present embodiment. In response to a download URL request from the application 109, the management server 107 identifies the download method based on the received download method information in S601 (S402). In S602, the management server 107 switches the processing based on whether the requested download method is the download method for a request from the application 109 of the first type. If it is determined that the requested download method is the download method for a request from the application 109 of the first type, the processing proceeds to S603. If it is determined that the requested download method is the download method for a request from the application 109 of the second type, the processing proceeds to S604.

If the requested download method is the download method for a request from the application 109 of the first type, the management server 107 returns the download URL of the origin server 105 to the application 109 in S603 (S404). On the other hand, if the requested download method is not the download method for a request from the application 109 of the first type, i.e., is the download method for a request from the application 109 of the second type, the processing proceeds to S604. In S604, the management server 107 returns the download URL of the edge server 106 to the application 109 (S407).

Figure 7:
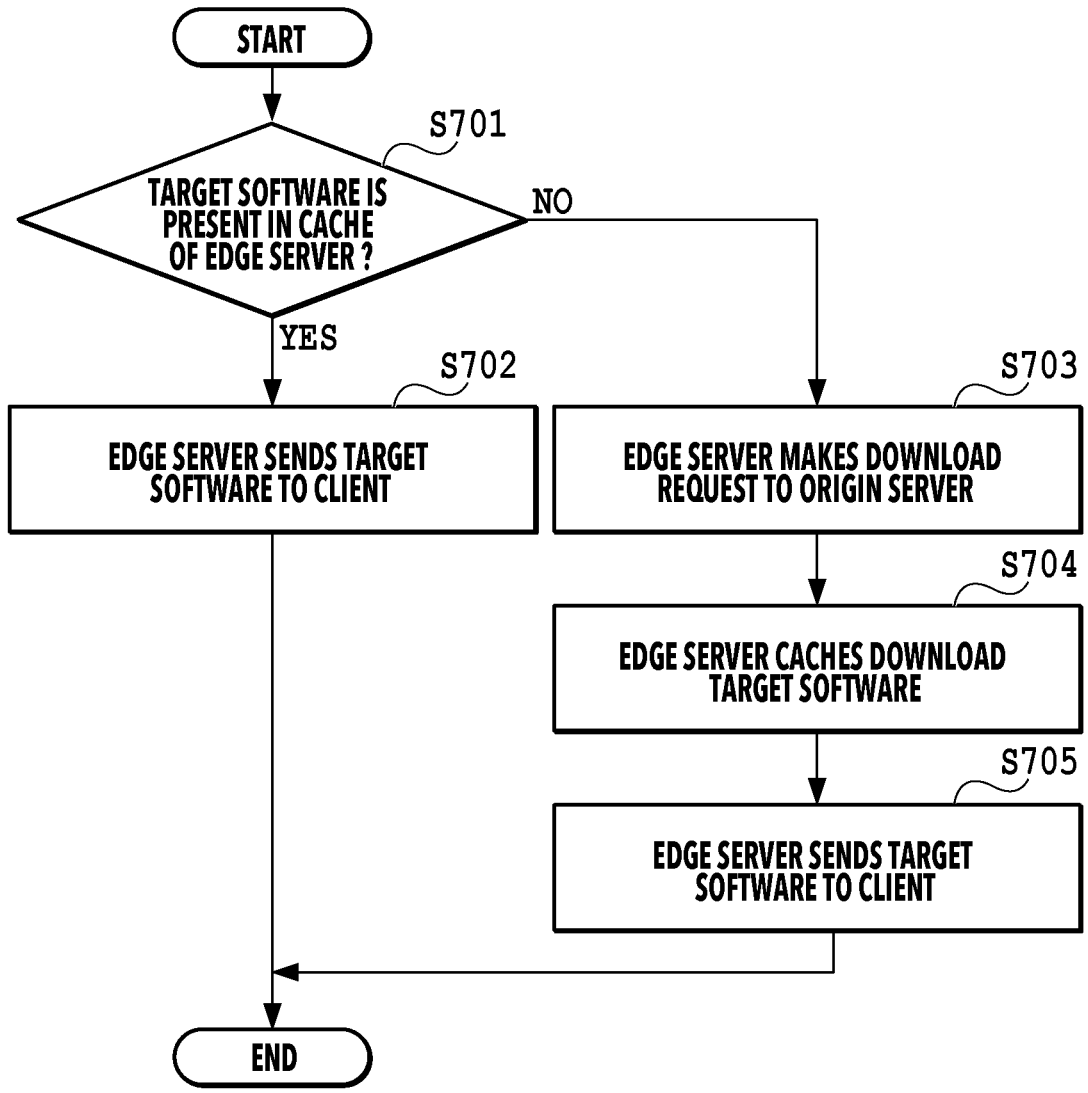
FIG. 7 is a flowchart illustrating an example of processing by an edge server.
Figure 8:
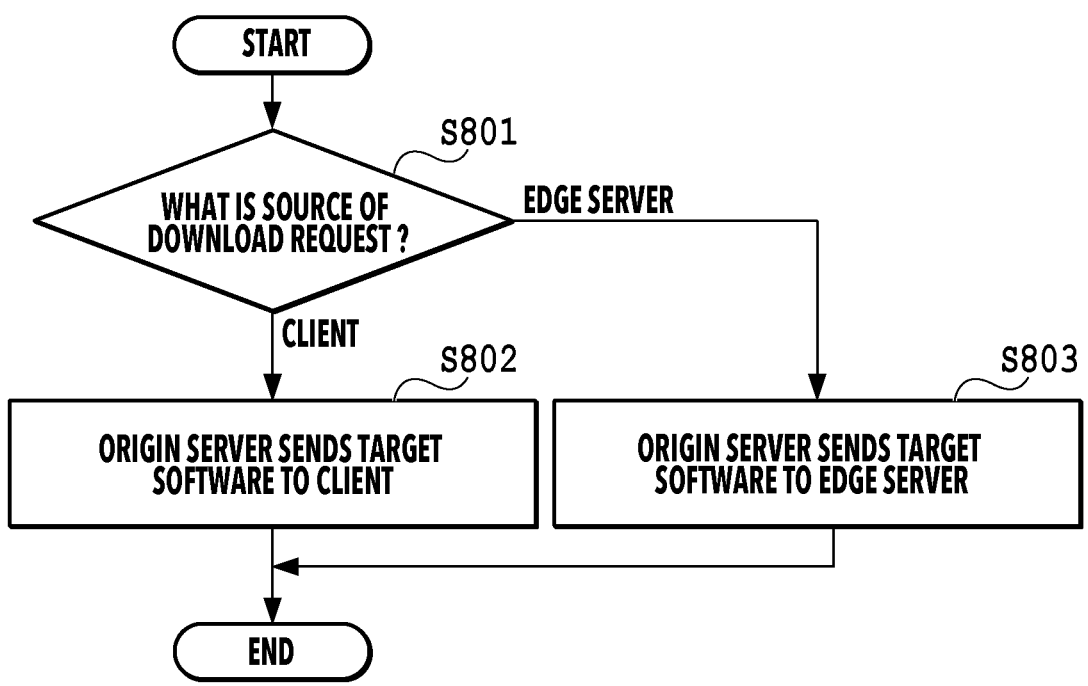
FIG. 8 is a flowchart illustrating an example of processing by an origin server.

FIG. 7 is a flowchart illustrating an example of processing by the edge server 106 in the present embodiment. In response to receiving a download request from the application 109, the edge server 106 determines in S701 whether the download target software 110 is present in a cache of the edge server 106. The processing is switched based on whether the download target software 110 is present in the cache. If the download target software 110 is present in the cached of the edge server 106, the processing proceeds to S702. Otherwise, the processing proceeds to S703.

If the download target software 110 is present in the cache, the edge server 106 sends the cached download target to the client in S702. In other words, the download target software 110 is downloaded from the edge server 106 into the client 102 (S410). If the download target software 110 is not present in the cache of the edge server 106, the edge server 106 makes a download request to the origin server 105 in S703 (S411). Thereafter, in S704, the edge server 106 caches the download target software 110 sent from the origin server 105 as a response to this download request (S413). Then, in S705, the edge server 106 sends the download target software 110 to the client 102. In other words, the download target software 110 is downloaded from the edge server 106 into the client 102 (S414).

FIG. 8 is a flowchart illustrating an example of processing by the origin server 105 in the present embodiment. The origin server 105 having received a download request determines the source of the download request in S801. If the source of the download request is the client 102 (application 109), the processing proceeds to S802. If the source of the download request is the edge server, the processing proceeds to S803. In S802, the origin server 105 sends the download target software 110 to the client 102. In other words, the download target software 110 is downloaded into the client 102. In S803, the origin server 105 sends the download target software to the edge server 106. In other words, the download target software 110 is downloaded into the edge server 106.

FIGS. 9A to 9C are diagrams for describing examples of automatic downloading and manual downloading. FIG. 9A is a screen for setting a method of updating the operating system 108. Note that the screen in FIG. 9A is a screen displayed by a setting application in the operating system 108 used in a smartphone or the like, for example. As mentioned earlier, this setting application may be implemented by the operating system 108 or by an application separate from the operating system 108. In a case where the user selects "Download and install" 901 in the screen in FIG. 9A, the operating system 108 instantly starts being downloaded. Specifically, in the case where the user selects "Download and install" 901, the application 109 or the operating system 108 sends a download URL request along with information indicating "manual downloading". On the other hand, in a case where the user selects "Automatically update" 902 in the screen in FIG. 9A, updating is performed at night or the like. Specifically, in the case where the user selects "Automatically update" 902, the application 109 or the operating system 108 sends a download URL request along with information indicating "automatic downloading".

As described above, the operation performed in the case of selecting "Download and install" 901 corresponds to the manual downloading described earlier. Hence, the download target software 110 is downloaded at a high speed from the edge server 106. On the other hand, the operation performed in the case of selecting "Automatically update" 902 corresponds to the automatic downloading described earlier. Hence, the download target software 110 is downloaded from the origin server 105. In the example of FIG. 9A, the download target software 110 corresponds to the operating system 108. Note that the source of the download request may be the operating system 108 and the application 109.

FIG. 9B is a screen for setting a method of updating the application 109 in a smartphone or the like. As with the example described in FIG. 9A, this setting screen may also be displayed by a setting application included in the operating system 108 or by a setting application separate from the operating system 108. Note that the screen in FIG. 9B is a screen displayed by the application 109 of the first type. The screen in FIG. 9B includes a checkbox 903 for indicating whether to automatically update the application 109. In a case where the checkbox 903 not checked, the user needs to manually update the application 109. For example, the updating procedure is such that the user individually selects icons of applications to perform the update. Such an updating procedure corresponds to the manual downloading described earlier. Thus, in the case where the checkbox 903 is not checked, the download target software is downloaded at a high speed from the edge server 106. On the other hand, in a case where the checkbox 903 is checked, the application 109 is automatically updated at night or the like. This corresponds to the automatic downloading described earlier, and the download target software is therefore downloaded from the origin server 105.

FIG. 9C is an example of a case where a message 904 prompting the user to update the application 109 is displayed due to a new version of software found when the application 109 is started. As with the example described in FIG. 9A, this setting screen may also be displayed by a setting application included in the operating system 108 or by a setting application separate from the operating system 108. Note that the screen in FIG. 9C is a screen displayed by the application 109 of the second type. By pressing an OK button 905 on a message 904 in the screen in FIG. 9C, a new version of the application 109 is downloaded. This corresponds to the manual downloading described earlier. Thus, in the case of applying the present embodiment, the new version is downloaded from the edge server 106.

As described above, according to the present embodiment, it is possible to reduce downloads from the edge server, thereby curbing costs, without impairing usability. Specifically, in response to receiving a download URL request from the application 109 or the operating system 108, the management server 107 identifies the download method. As with automatic downloading, in a case where it is acceptable to take time to download the target software, it is downloaded from the origin server 105. On the other hand, as with manual downloading, in a case where it is necessary to download the target software at a high speed, it is downloaded from the edge server 106. In this way, it is possible to reduce downloads from the edge server, thereby curbing costs, without impairing usability.

Second Embodiment

In the first embodiment, an example in which the management server 107 identifies the download method has been described. In the present embodiment, an example in which the edge server 106 identifies the download method will be described. Note that the basic configuration of the information processing system is similar to that in the example described in the first embodiment, and description thereof is therefore omitted.

Figure 10:
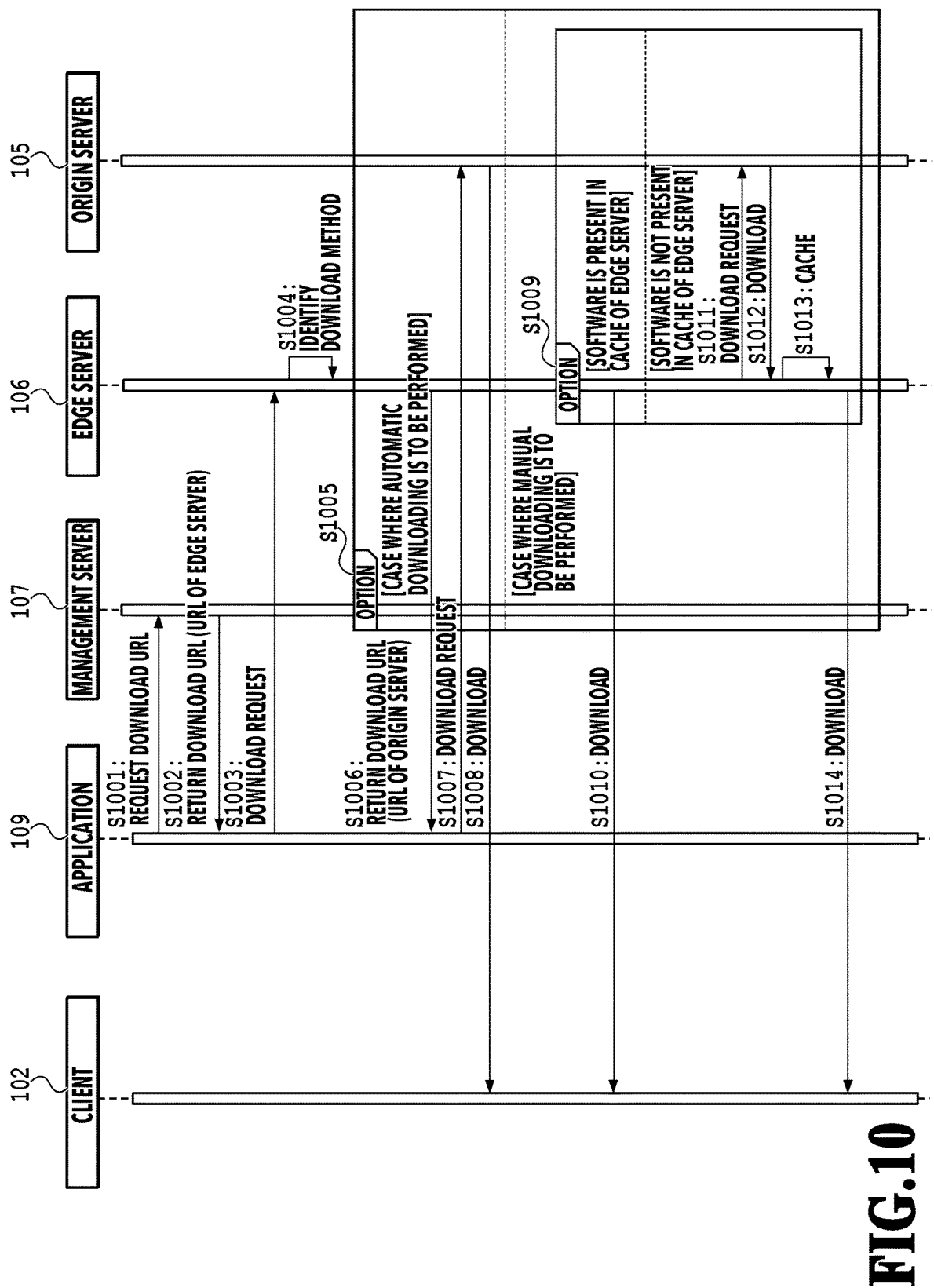
FIG. 10 is a diagram illustrating an example of a processing sequence.

FIG. 10 is a diagram illustrating an example of a processing sequence in the present embodiment. In S1001, the application 109 requests the download URL of the download target software 110 from the management server 107. In S1002, the management server 107 returns the download URL of the edge server 106 to the application 109. In S1003, the application 109 makes a download request to the edge server 106. S1001 to S1003 are similar processes to the processes of S301 to S303 in FIG. 3 described as a comparative example. Note that, as described in the first embodiment, the management server 107 having received the request in S1001 may identify the download method and return a download URL to which information indicating that identified method is added.

In S1004, the edge server 106 identifies the download method. Specifically, like the process performed in S402 by the management server 107 in the first embodiment, the edge server 106 identifies the download method. The identification method is similar to that in the example described in the first embodiment, and description thereof is therefore omitted. Note that, in the present embodiment, at least the download request in S1003 contains download method information.

In S1005, the processing by the edge server 106 branches based on whether the download method for the request in S1003 is the download method for a request from the application 109-a. In the case of a request from the application 109-a, a process of S1006 is performed. In S1006, the edge server 106 returns the URL of the origin server 105 to the application 109. Then, in S1007, the application 109 accesses the URL of the origin server 105 and makes a download request. Thereafter, in S1008, the download target software 110 is downloaded from the origin server 105 into the client 102. In this case, the download time required is the one from the origin server 105. However, the costs required for the download are curbed since the edge server 106, which is provided by a CDN or the like, is not used.

On the other hand, in the case of a request from the application 109-b, processes of S1009 and subsequent steps are performed instead of the processes of S1006 to S1008. In S1009, the processing branches based on whether the download target software 110 is present in the cache of the edge server 106. If the download target software 110 is present in the cache of the edge server 106, the process of S1010 is performed. In S1010, the download target software 110 is downloaded from the edge server 106 into the client 102.

If the download target software 110 is not present in the cache of the edge server 106, the process of S1011 is performed. In S1011, the edge server 106 makes a download request to the origin server 105. In S1012, the download target software 110 is downloaded from the origin server 105 into the edge server 106. In S1013, the download target software 110 is cached into the edge server 106. In S1014, the download target software 110 is downloaded from the edge server 106 into the client 102.

As described above, in the present embodiment too, it is possible to reduce downloads from the edge server, thereby curbing costs, without impairing usability, as with the example described in the first embodiment. Note that the process of S1005 may be switched based on whether the download method is automatic downloading or manual downloading, as with the example described in the first embodiment.

OTHER EMBODIMENTS

In each of the embodiments described above, an example has been described in which the download method is identified, and the processing is switched based on the result of the identification. However, the criterion to be used to switch the processing is not limited to this example. For example, in a case where a download request is made in HTTP, the processing may be switched based on whether the HTTP request is a synchronous call or an asynchronous call. A synchronous call is a call method in which the client waits until a response is returned after the client makes an HTTP request. Since the client continues to wait for a response, it is desirable that the response be returned quickly. With an asynchronous call, the client does not wait for a response after making an HTTP request. It is therefore not necessary to return a response quickly.

Thus, in the case of making a download request with a synchronous call, control may be performed such that the download target software is downloaded from the edge server 106, as with manual downloading. In the case of making a download request with an asynchronous call, control may be performed such that the download target software is downloaded from the origin server 105, as with automatic downloading. As described above, the processing may be switched according to the call method, i.e., based on whether an HTTP request is a synchronous call or an asynchronous call. The switching of the processing is not limited to these examples. In a case where the download method is a first method in which taking time for download processing is acceptable, the software is downloaded from the origin server 105. In a case where the download method is a second method in which taking time for download processing is less acceptable than in the first method, the software is downloaded from the edge server. The processing may be switched in this manner too.

As described in the above embodiments, an application (or the operating system) that makes a download request and the download target software may be the same type of application or different types of applications.

In the above embodiments, examples have been described in which a personal computer or a smartphone is used as the client to download software. However, the configuration is not limited to this example. The configuration may be such that software such as firmware is downloaded from an apparatus such as a printer. Also, the configuration may be such that software is downloaded from an execution environment such as a virtual server or container on the cloud.

In the above embodiments, HTTP communication has been described as an example of the communication between the client and the servers. However, the communication is not limited to this example. As for the communication protocol, any protocol can be used, and a different communication protocol may be used.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-156654, filed Sep. 27, 2021, which is hereby incorporated by reference wherein in its entirety.

What is claimed is:

1. An information processing method using a server system which includes at least an edge server capable of caching first software to be downloaded and an origin server having an original of the first software placed therein, and communicates with a client, the information processing method comprising:
   receiving a download request from second software executed by the client;
   identifying, based on the download request, whether the second software is a program of a first type or a program of a second type;
   causing the client to download the first software from the origin server in a case where it is identified that the second software is the program of the first type; and
   causing the client to download the first software from the edge server in a case where it is identified that the second software is the program of the second type.

2. A management server which causes a client to download a first software from an edge server or an origin server, the edge server capable of caching first software to be downloaded, the origin server having an original of the first software placed therein, the management server comprising:
   one or more memory that stores instructions; and
   one or more processor that executes the instructions to:
   receive a download request from second software executed by the client;
   identify, based on the download request, whether the second software is a program of a first type or a program of a second type;
   cause the client to download the first software from the origin server in a case where it is identified that the second software is the program of the first type; and
   cause the client to download the first software from the edge server in a case where it is identified that the second software is the program of the second type.

17

3. The management server according to claim 2, wherein the program of the first type is a program which is not a program to be updated by the first software, and the program of the second type is a program to be updated by the first software.

4. The management server according to claim 2, wherein, the one or more processor executes the instructions to cause the client to download the first software cached in the edge server in a case where it is identified that the second software is the program of the second type.

5. The management server according to claim 4, wherein, in a case where the first software is not cached in the edge server, the edge server downloads the first software from the origin server and caches the first software.

6. The management server according to claim 2, wherein the management server and the edge server are configured as a single server apparatus.

7. The management server system according to claim 2, wherein
the one or more processor executes the instructions to:
cause the client to download the first software from the origin server by sending a uniform resource locator (URL) indicating the origin server to the client in a case where it is identified that the second software is the program of the first type; and
cause the client to download the first software from the edge server by sending a uniform resource locator (URL) indicating the edge server to the client in a case where it is identified that the second software is the program of the second type.

8. The management server according to claim 2, wherein it is identified, based on information contained in the download request, whether the second software is the program of the first type or the program of the second type.

9. A non-transitory computer readable storage medium storing a program which causes at least one computer to execute an information processing method using a server system which includes at least an edge server capable of caching first software to be downloaded and an origin server having an original of the first software placed therein, and communicates with a client, the information processing method comprising:
receiving a download request from second software executed by the client;
identifying, based on the download request, whether the second software is a program of a first type or a program of a second type;
causing the client to download the first software from the origin server in a case where it is identified that the second software is the program of the first type; and
causing the client to download the first software from the edge server in a case where it is identified that the second software is the program of the second type.

10. A management server which causes a client to download a first software from an edge server or an origin server, the edge server capable of caching first software to be downloaded, the origin server having an original of the first software placed therein, the management server comprising:
one or more memory that stores instructions; and
one or more processor that executes the instructions to:
receive a download request from second software executed by the client;
identify a download method based on the download request;
cause the client to download the first software from the origin server in a case where the identified download method is automatic downloading, and

18 cause the client to download the first software from the edge server in a case where the identified download method is manual downloading.

11. An information processing method using a server system which includes at least an edge server capable of caching first software to be downloaded and an origin server having an original of the first software placed therein, and communicates with a client, the information processing method comprising:
receiving a download request from second software executed by the client;
identifying a download method based on the download request; and
causing the client to download the first software from the origin server in a case where the identified download method is automatic downloading, and
causing the client to download the first software from the edge server in a case where the identified download method is manual downloading.

12. A non-transitory computer readable storage medium storing a program which causes at least one computer to execute an information processing method using a server system which includes at least an edge server capable of caching first software to be downloaded and an origin server having an original of the first software placed therein, and communicates with a client, the information processing method comprising:
receiving a download request from second software executed by the client;
identifying a download method based on the download request; and
causing the client to download the first software from the origin server in a case where the identified download method is automatic downloading, and
causing the client to download the first software from the edge server in a case where the identified download method is manual downloading.

13. A management server which causes a client to download a first software from an edge server or an origin server, the edge server capable of caching first software to be downloaded, the origin server having an original of the first software placed therein, the management server comprising:
one or more memory that stores instructions; and
one or more processor that executes the instructions to:
receive a download request from second software executed by the client;
identify whether the download request is performed with an asynchronous call or a synchronous call; and
cause the client to download the first software from the origin server in a case where it is identified that the download request is performed with the asynchronous call, and
cause the client to download the first software from the edge server in a case where it is identified that the download request is performed with the synchronous call.

14. An information processing method using a server system which includes at least an edge server capable of caching first software to be downloaded and an origin server having an original of the first software placed therein, and communicates with a client, the information processing method comprising:
receiving a download request from second software executed by the client;
identifying whether the download request is performed with an asynchronous call or a synchronous call;

causing the client to download the first software from the origin server in a case where it is identified that the download request is performed with the asynchronous call, and causing the client to download the first software from the edge server in a case where it is identified that the download request is performed with the synchronous call.

15. A non-transitory computer readable storage medium storing a program which causes at least one computer to execute an information processing method using a server system which includes at least an edge server capable of caching first software to be downloaded and an origin server having an original of the first software placed therein, and communicates with a client, the information processing method comprising:

receiving a download request from second software executed by the client;

identifying whether the download request is performed with an asynchronous call or a synchronous call;

causing the client to download the first software from the origin server in a case where it is identified that the download request is performed with the asynchronous call, and causing the client to download the first software from the edge server in a case where it is identified that the download request is performed with the synchronous call.

* * * * *